April 16, 1929. C. G. GARRARD 1,709,346
VARIABLE SPEED GEARING
Filed Sept. 23, 1927 2 Sheets-Sheet 1
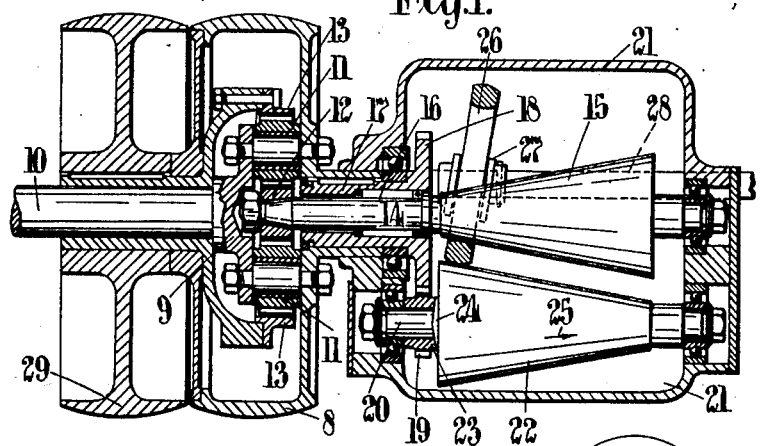
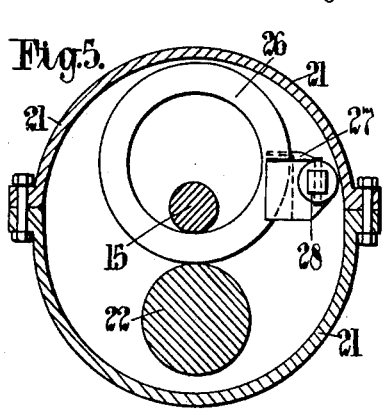
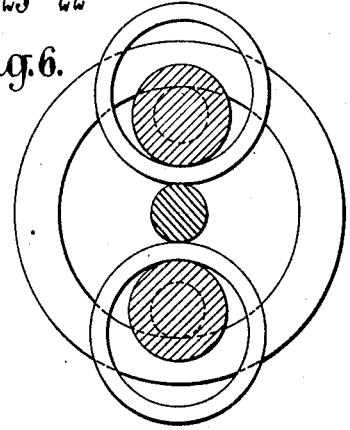
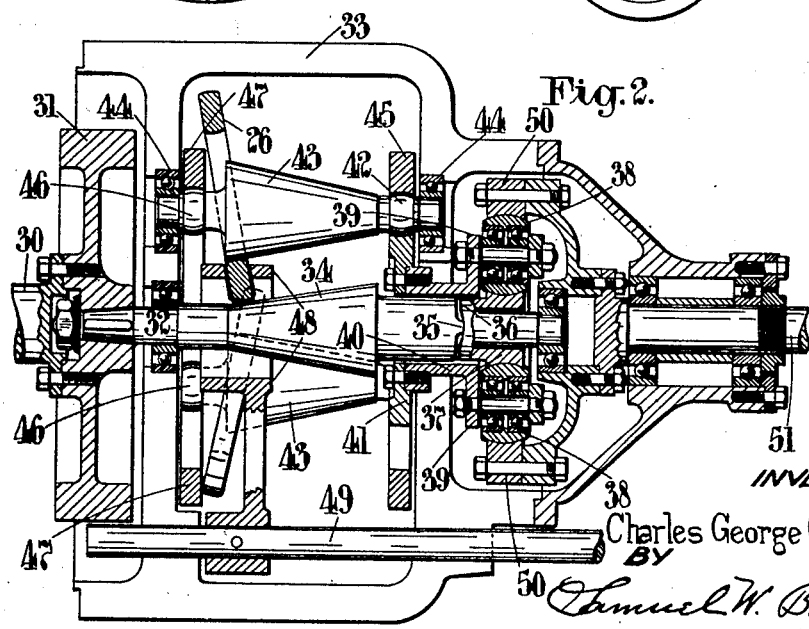
INVENTOR,
Charles George Garrard,
BY
Samuel W. Balch
ATTORNEY.

April 16, 1929.  C. G. GARRARD  1,709,346
VARIABLE SPEED GEARING
Filed Sept. 23, 1927  2 Sheets-Sheet 2
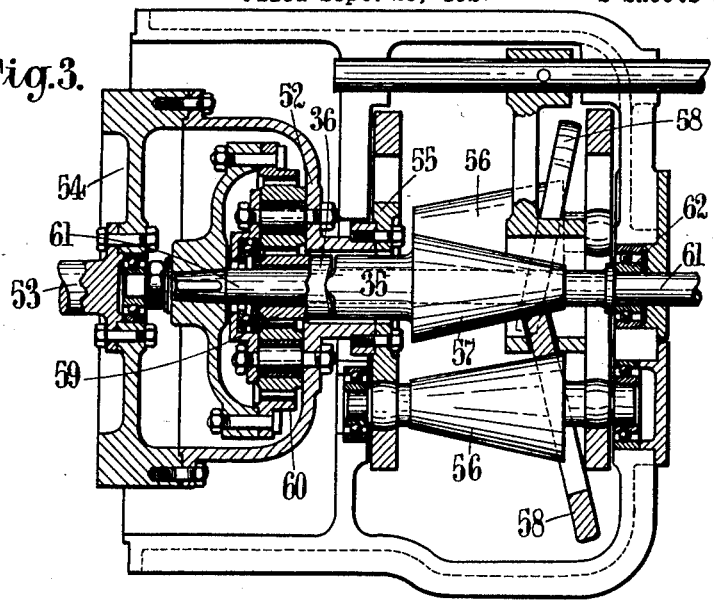
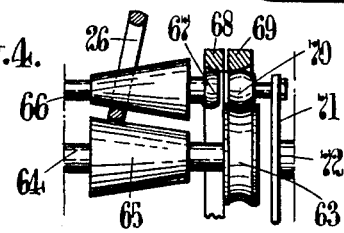
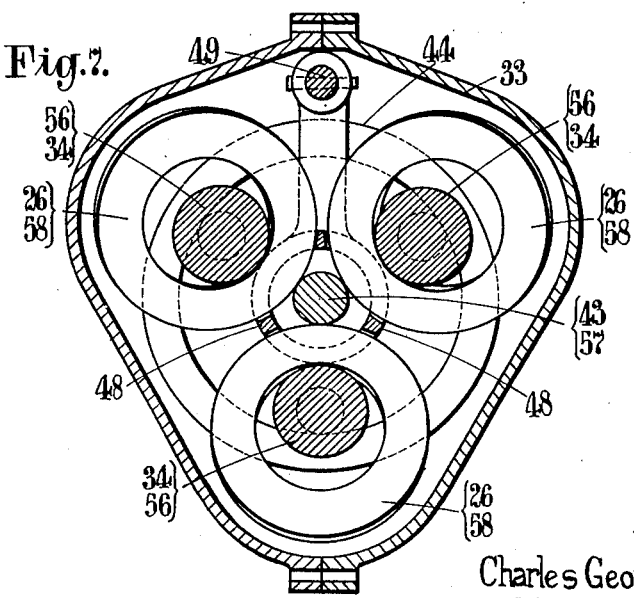
INVENTOR.
Charles George Garrard
BY
Samuel W. Balch
ATTORNEY.

Patented Apr. 16, 1929.

1,709,346

UNITED STATES PATENT OFFICE.

CHARLES GEORGE GARRARD, OF LONDON, ENGLAND, ASSIGNOR TO GARRARD GEARS LIMITED, OF LONDON, ENGLAND, A LIMITED LIABILITY COMPANY.

VARIABLE-SPEED GEARING.

Application filed September 23, 1927, Serial No. 221,430, and in Great Britain July 15, 1927.

This invention relates to variable speed gearing and has for its objects to provide such gearing by means of which any desired speed changes may be effected both in a forward and reverse direction to give any ratio in either direction of rotation.

In general, variable speed gearing constructed according to the invention comprises at least one epicyclic train, toothed, friction, or otherwise, having the usual sun, cage or the like with satellites, and annulus elements, any two of which elements are connected together through any desired form of variable gear, so that the third element is left free to be connected to the shaft or the like to be driven, which shaft in some cases may be the driving shaft.

The method of connecting the variable gear to the epicyclic train may vary and in some cases the driving shaft for the variable gear may drive directly one of the elements of the said epicyclic train, a variably driven shaft or the like of the variable gear being connected to either of the other elements, for example to one of the satellites carried by the cage or the like, which cage or the like may be represented by a fixed casing.

The preferred form of variable gear to be connected to any two of the elements of the epicyclic train comprises two oppositely directed conical members of similar conicity with their axes parallel and a desired distance apart to leave a gap of constant dimensions between the portions of their surfaces coming adjacent, in which gap a transmitting member or members are mounted to frictionally transmit the movements of one cone to the other, means being provided to maintain the parts in tight frictional gripping and driving contact and for adjusting the position of the transmitting member with respect to the cones. In this manner the linear speed of the conical member which is driven, in the position where contact is made by the intermediate member, is transmitted to the cone to be driven and as a consequence the ratio of speed between the two conical members depends upon the position of the transmitting member. The parts may be maintained in tight driving contact by imparting end thrust to one of the cones and the means for transmitting end thrust to one of the cones which may be the driving or driven cone, preferably the latter, may be of a resilient nature such as a spring acting to move the conical member axially or may be cam means also adapted to cause axial movement. To act as a balancing means for journal thrust and for generally equalizing the drive of the variable gear, two or more similar conical members may be arranged at desired and preferably equi-angular distances apart around a central and oppositely directed conical member and the radially arranged conical members may be carried by bearings, for example a cage held in position by floating rings, the radial thrust outwards holding the parts in position.

The intermediate transmitting member between the central cone and the other cone or cones may be constituted by two or more suitably mounted balls, rollers or the like, but in preferred forms between the central member and each cone a freely rotating ring is provided. Each ring is of desired diameter and the section of the material of the ring is preferably such that its greatest dimension equals the dimension between the surfaces of the cones, the inner and outer surfaces of the ring being curved with a similar curvature. Means are provided for varying the position of the intermediate transmitting member in a longitudinal direction and where more than one such member is provided, for example two or more floating rings, these are controlled by the same position varying means.

In order that the invention may be better understood, it will now be described with reference to the accompanying drawings in which:—

Figs. 1, 2 and 3 show sectional plans of a number of gears constructed according to the invention.

Fig. 4 shows a diagram of another variation.

Figs. 5, 6 and 7 show fragmentary cross section views of the gears, illustrating the method of operating the variable gear portion of the device.

Many forms of gears can be devised wherein the invention may be employed, for example the variable portion of the gear can be so connected to the epicyclic train that a constant drive is given to the central shaft or sun pinion and a variable drive to the cage, which results in the ring being the driven member. Similarly, a constant drive can be given to the cage, and a variable drive to the sun member or central shaft which also results in the ring being the driven member. With other forms a constant drive can be given to the central shaft or sun member, a variable drive to the ring or annulus, the result being that the cage is the driven member. With other arrangements the cage can have the constant drive whilst the ring has the variable drive, the sun member being driven. With still further arrangements the ring may have the constant drive whilst either the sun or the cage has the variable drive, the remaining element being the driven member.

A number of these arrangements is shown on the accompanying drawings.

For the purpose of carrying the invention into practical effect an epicyclic gear having three moving members is provided; one of the members is connected to the driving shaft, the second to the shaft to be driven, whilst the third member is connected to or has arranged alongside and integral therewith or geared thereto, a conical drum of hardened and polished steel or other suitable material.

A variety of such arrangements is shown on the drawings and in Fig. 1, 8 is a driving pulley which is connected by suitable studs and distance pieces to the cage 9 of an epicyclic gear, the cage having a shaft 10 which is supported in suitable bearings not shown in the drawings. The studs and distance pieces of the cage have rotating thereon satellite or planet pinions 11 which mesh with a sun pinion 12 and with a toothed ring or annulus 13. The sun pinion 12 is mounted on the end of a shaft 14 which has formed with or mounted thereon a conical drum 15 of hardened and polished steel or other suitable material. The shaft 14 is supported in a roller bearing 16 in the interior of a sleeve 17 keyed to a sleeve-like extension of the boss of the driving pulley 8. This sleeve 17 has formed with or attached to one end thereof a toothed wheel 18 which meshes with a toothed pinion 19 on a shaft 20 supported in suitable bearings in a casing 21. The shaft 20 has keyed thereto a secondary conical drum 22 and this drum 22 is driven by the pinion 19 in the following manner. The boss of the pinion 19 is formed at 23 with a cam surface of a somewhat wedge-like nature which co-operates with a corresponding wedged boss 24 on the drum 22, the arrangement being such that when power is applied for transmission and the pinion 19 is driving the roller 22, the roller is forced by the cam surface of the pinion in the direction of the arrow 25, and the conical members are maintained in tight driving contacts with the transmitting member.

As will be seen, the secondary drum 22 is arranged parallel to the first mentioned conical drum but tapering in the opposite direction, whilst in contact with and free to rotate between the two conical drums 15 and 22 is an intermediate transmitting member 26 formed by a floating ring. This is adapted to be moved laterally by a striking mechanism comprising fork-like jaws 27 (Figs. 1 and 5) coming on either side of the ring mounted upon a sliding rod 28 in connection with any suitable operating mechanism (not shown). The internal and external surfaces of the ring 26 which come in contact with the conical drums 15 and 22 are curved as shown by the section of the ring. The axial thrust due to the co-acting cam surfaces 23 and 24 of the conical roller 22 serves to keep the cones 15 and 22 and the ring 26 in tight frictional driving contact. As will be understood, the driving pulley 8 causes the toothed wheel 18 to drive the pinion 19 which in turn causes the drive of the conical roller 22 and this transmits the drive to the conical roller 15, and to the sun pinion 12. The conical roller 15 is variably driven from the conical roller 22 according to the position into which the ring 26 is moved by the striking gear 27 and 28.

It will be seen from the above that a constant drive is imparted to the cage 9, and a variable drive to the sun pinion 12, and as a consequence the annulus or ring 13 is driven variably and transmits its drive to the pulley 29.

In some cases more than one secondary conical drum 22 may be provided arranged parallel to the primary conical drum and tapering in the opposite direction.

In the form of the device shown in Fig. 2 the epicyclic train is of the frictional type with somewhat spherical surfaces on the satellites engaging with concavities on the sun and annulus members by friction, means preferably being provided setting up axial thrust to give the required frictional adhesion. In this figure, 30 is an engine shaft having a fly wheel 31 bolted thereto. This engine shaft has keyed thereto a shaft 32 mounted in ball bearings in a fixed casing 33, the said shaft 32 being provided with a primary conical member 34. An extension of the boss of this conical member 34 is formed with radial projections 35 co-acting with cam surfaces 36 on the boss of the frictional sun pinion 37. It will thus be seen that the sun pinion 37 receives a constant drive from the shaft 30 and an axial thrust by the co-acting parts 35 and 36.

38 are the frictional satellites carried by a cage 39 having an extended boss 40 to which is bolted a frictional central member 41 engaging with frictional planet members 42 towards the ends of the spindles of three secondary conical members 43. The actual ends of the conical members 43 are mounted in bearings 44 supported by the casing 33. 45 is a floating annulus co-acting with the satellite members 42 and at the other ends of the secondary members 43 other satellite frictional members 46 are provided with which the floating frictional annulus 47 engages.

A number of displaceable floating rings 26 are provided which come between the primary and secondary arms 34 and 43 in a manner similar to that described with regard to the ring 26 and conical members 15 and 22 in Fig. 1. In this case three rings 26 are provided all operated by a striking gear 48 in connection with a sliding rod 49. Fig. 7 shows the arrangement of the rings 26 and rollers 34 and 43. By sliding the rod 49 the rings 26 can be brought into any desired position between the rollers 34 and 43. By this means the cage 39 is given a variable drive from the sun pinion 37 and as a consequence the annulus 50, that is to say the third member of the epicyclic train, is given a varied drive, which is imparted to the shaft 51, which is the shaft to be driven.

Referring to the form shown in Fig. 3, in this case the arrangement is such that a constant drive is applied to the cage 52 from an engine shaft 53 having a fly wheel 54 thereon, the cage being connected to a frictional sun pinion 55 driving a number of secondary rollers 56 in a manner as set forth in the form shown in Fig. 2 which in turn drives a primary conical member 57 through the floating rings 58, the structure of these parts being also similar to that shown with reference to Figs. 2 and 7. The primary conical member 57 through projecting and cam members 35 and 36 similar to those described with regard to Fig. 2 drives the sun pinion 59 in a variable manner. As a consequence the ring or annulus 60 is driven by the planet or satellite members 52 and imparts its motion to a shaft 61 passing loosely through the hollow shaft of the sun pinion 59 and the hollow shaft of the primary conical member 57 as shown. The shaft 61 is mounted in suitable bearings 62.

The arrangement illustrated diagrammatically in Fig. 4 shows a case where a frictional sun pinion 63 is driven from a driving shaft 64 which has a primary cone 65 thereon. This primary cone variably drives a secondary cone through the floating and displaceable ring 26, a frictional satellite 67 driving a ring 68 coupled to another ring 69 driving a frictional satellite 70 carried by a cage 71 attached to a shaft 72 to be driven. The drawing is only diagrammatic and it will be understood that to obtain a balanced action a number of secondary conical members 66 with associated satellites 67 would be employed as well as a number of satellites 70 and a cage 71 co-operating with the sun pinion 63.

Fig. 6 shows a view somewhat similar to Figs. 5 and 7 but in this case only two floating rings 26 are employed co-operating with the primary and secondary conical rollers, with one floating ring co-ordinating the movements of the two secondary conical members.

The speed ratio of the conical drums and the epicyclic gearing in all cases is preferably arranged in such a manner that when any reduction of speed is taking place between the driving and driven members, the surface speed of the conical drum is higher than when the driving or driven members are running at the same speed, thus obtaining the required increased torque without abnormally increasing the pressure required for adhesion of the rolling surfaces.

To illustrate the above, presume an epicyclic train of gears having a ratio of one to four is utilized, and the driving member connected to the cage carrying the satellite gear member or members, the driven member being connected to the internal toothed or outer gear member and the centre pinion connected to a primary conical drum, in fact the arrangement being similar to that shown in Figs. 1 and 3. It will be obvious that if the driven member is held stationary, and the driving member rotated, the centre pinion will rotate four times the speed of the driving member and therefore when the speed of the centre pinion is altered to less than four times of speed of the driving member, the driven member or outer ring of gear will be caused to rotate in the same direction. As the speed of the centre member or pinion is further reduced until it is rotating at the same speed as the driving member, the driven member will be caused to also rotate at the same speed as the driving member giving a straight through drive with no reduction of speed. Similarly if the speed of the centre pinion is caused to be greater than four times the driving member, the driven member will be rotated in the opposite direction giving a reversal of motion which can be increased to any desired ratio to the driving member, but in the opposite direction.

To control and rotate the centre pinion is the function of the before mentioned conical drums; the secondary conical drum or drums are geared to the driving member so as to have any desired ratio of speed which for the sake of illustration may be the same as the epicyclic train before mentioned, and the ratio of diameter of the conical drums to each other may be varied as desired to suit requirements. For example in some cases the ratio may be from four to one up to one to two. The secondary conical drum or drums which are geared to the driving member will therefore rotate at a fixed relative speed to the said driving member while the primary conical drum which is connected to the centre pinion will be rotated by the adhesion of the transmission members placed between the conical drums. As the transmission members are moved laterally they will be in contact with varying diameters on the conical drum or drums and will thereby vary the speed of the centre pinion and consequently vary the speed of the driven member in either direction of rotation according to their lateral position along the conical drum or drums.

To obtain the necessary binding pressure for adhesion upon the floating transmission members one or more of the conical drums as before described have axial or lateral pressure applied by cams or springs, or any other suitable means may be used for the purpose. The reaction to the binding pressure may be taken upon the journal bearing of the conical drums in gears for small power, but in large power gears two or more secondary conical drums are arranged as before described in epicyclic formation around the primary conical drum and at each end of the secondary drums, comprising the set, is arranged a parallel circular portion of equal diameters in contact with encircling rings of sufficient strength to take the adhesion pressure set up by the binding pressure upon the transmission members between the primary and secondary conical drums.

Another method of creating the binding pressure upon the conical drums when two secondary drums and one primary drum are arranged on a common centre, is by allowing the encircling rings co-acting with the parallel portions to float as before described.

For moving laterally the transmission members subjected to binding pressure, I arrange that the operating slide causes the rings, rollers or the like to tilt and thus give a spiralling action between the two conical drums. To give the necessary tilt as desired in either direction when rollers are employed the housing of the rollers is suspended upon a hinge at right angles to their running axis with a limited and adjustable motion whereby any movement of the controlling slide will tilt or skew the rollers causing them to move laterally until they overtake the controlling slide when the tilting will automatically correct itself.

When balls instead of rollers are used between the conical drums, the housing is arranged so that the balls are free to rotate in any direction enabling movement to take place laterally while subject to binding pressure and rotating in their normal direction, by any suitable sliding mechanism.

Alternatively and preferably, as before explained, instead of using rollers or balls to transmit power from the one conical drum to the other a surrounding ring is used or both a ring and rollers or balls which ring passes between and is gripped between the conical members.

Any type of gearing may be used for driving the conical drums; also the conical drums may be placed at any convenient angle to the driving members by interposing skew or bevel gearing.

The control of speed variation may be arranged automatically by a governor controlling the tilting of rings, rollers or the like between the conical drums, or alternatively the tilting may be controlled by the reactional torque acting upon an adjustable spring.

For disconnecting the power transmission any suitable form of clutch may be used with, or as part of the gearing described.

The invention is not limited to the precise forms or details of construction described as these may be varied to suit particular cases.

What I claim and desire to secure by Letters Patent of the United States of America is:—

1. In a variable speed gearing of the type described, a primary conical member, secondary conical members arranged around the primary conical member and coned in reverse direction to the primary member, coacting movable transmission members between the primary conical member and the secondary conical members, and a frictional annulus member engaging suitably formed portions of the secondary conical members.

2. In a variable speed gearing of the type described, a primary conical member, secondary conical members arranged around the primary conical member, coacting movable transmission members between the primary conical member and the secondary conical members, a frictional annulus member engaging suitably formed portions of the secondary conical members, and a power transmission connection with the secondary conical members.

3. In a variable speed gearing of the type described, a primary conical member, secondary conical members arranged around the primary conical member, coacting movable transmission members between the primary conical member and the secondary conical members, and a pair of frictional annulus members engaging the secondary conical members and between which the coned portions are located.

In witness whereof I affix my signature.

CHARLES GEORGE GARRARD.